United States Patent [19]
Hasebe et al.

[11] Patent Number: 5,446,748
[45] Date of Patent: Aug. 29, 1995

[54] APPARATUS FOR PERFORMING LOGIC SIMULATION

[75] Inventors: Tetsuya Hasebe, Suginami; Hiroaki Hayashi, Sagamihara; Kazuki Shinoda, Yokohama, all of Japan

[73] Assignee: Tokyo Electron Limited, Tokyo, Japan

[21] Appl. No.: 379,769

[22] Filed: Jan. 27, 1995

Related U.S. Application Data

[60] Division of Ser. No. 193,601, Jan. 26, 1994, which is a continuation of Ser. No. 639,892, Jan. 11, 1991, abandoned.

[30] Foreign Application Priority Data

Jan. 12, 1990 [JP] Japan ................... 2-4926

[51] Int. Cl.$^6$ .............. G11B 27/00; H03M 13/00; H04L 7/00
[52] U.S. Cl. ..................... 371/61; 371/23
[58] Field of Search .......... 371/61, 23, 57.1

[56] References Cited

U.S. PATENT DOCUMENTS

| | | | |
|---|---|---|---|
| 3,633,100 | 1/1972 | Heilweil | 371/23 X |
| 4,787,061 | 11/1988 | Nei | 364/900 |
| 4,787,062 | 11/1988 | Nei | 364/900 |
| 4,924,430 | 5/1990 | Zasio et al. | 371/23 X |
| 5,051,938 | 9/1991 | Hyduke | 371/23 X |
| 5,091,872 | 2/1992 | Agrawal | 364/578 |
| 5,095,454 | 3/1992 | Huang | 364/578 |
| 5,105,374 | 4/1992 | Yoshida | 371/23 X |

OTHER PUBLICATIONS

Ghosh, Behavioral-Level Fault Simulation, Jun. 1988 IEEE Design and Test of Computers, pp. 31–42.

Primary Examiner—Robert W. Beausoliel, Jr.
Assistant Examiner—Glenn Snyder
Attorney, Agent, or Firm—Oblon, Spivak, McClelland, Maier, & Neustadt

[57] ABSTRACT

A logic simulation apparatus which performs logic simulation of an operation of a logic circuit which includes at least a plurality of logic cells and a plurality of nets connecting the logic cells together, including a check circuit having at least one data input to which a data input signal is applied, a clock input to which a clock signal is applied, and an output. The check circuit compares the data input signal with a predetermined data value at a timing determined by the clock input signal and produces at its output a timing error detection signal based on the comparison. A memory cell is connected to the check circuit and has the data input signal applied to one input thereof, and the output signal of the check circuit applied to another input of said memory cell. The memory cell outputs the data input signal when the timing error detection circuit indicates that no timing error has occurred and outputs a signal which exhibits neither a high level nor a low level when the timing error detection signal indicates a timing error has occurred. Thereafter, logic simulation is executed on the basis of the output signal output by the memory cell so that said output signal is immediately propagated in the logic simulation.

1 Claim, 9 Drawing Sheets

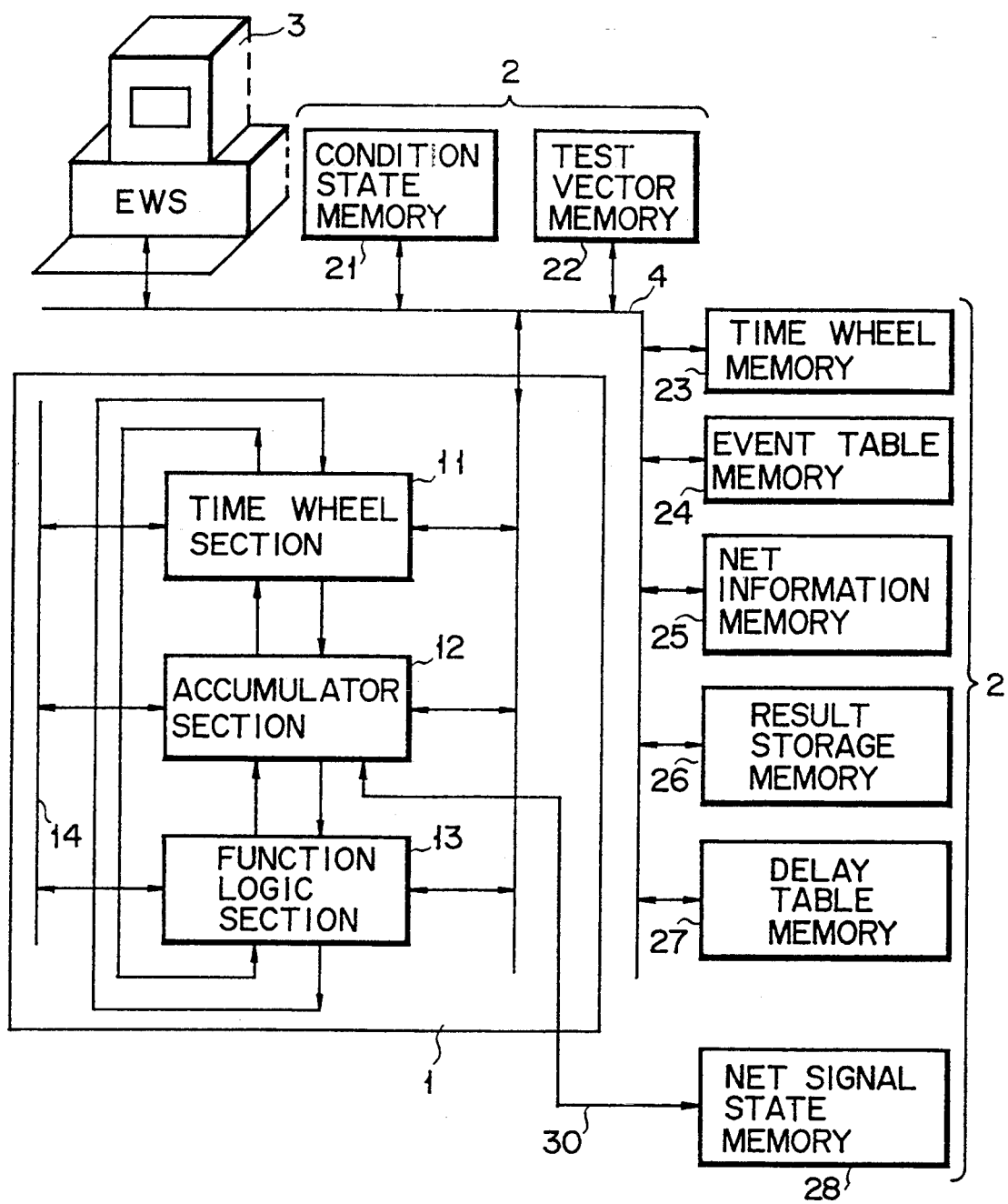
F I G. 1

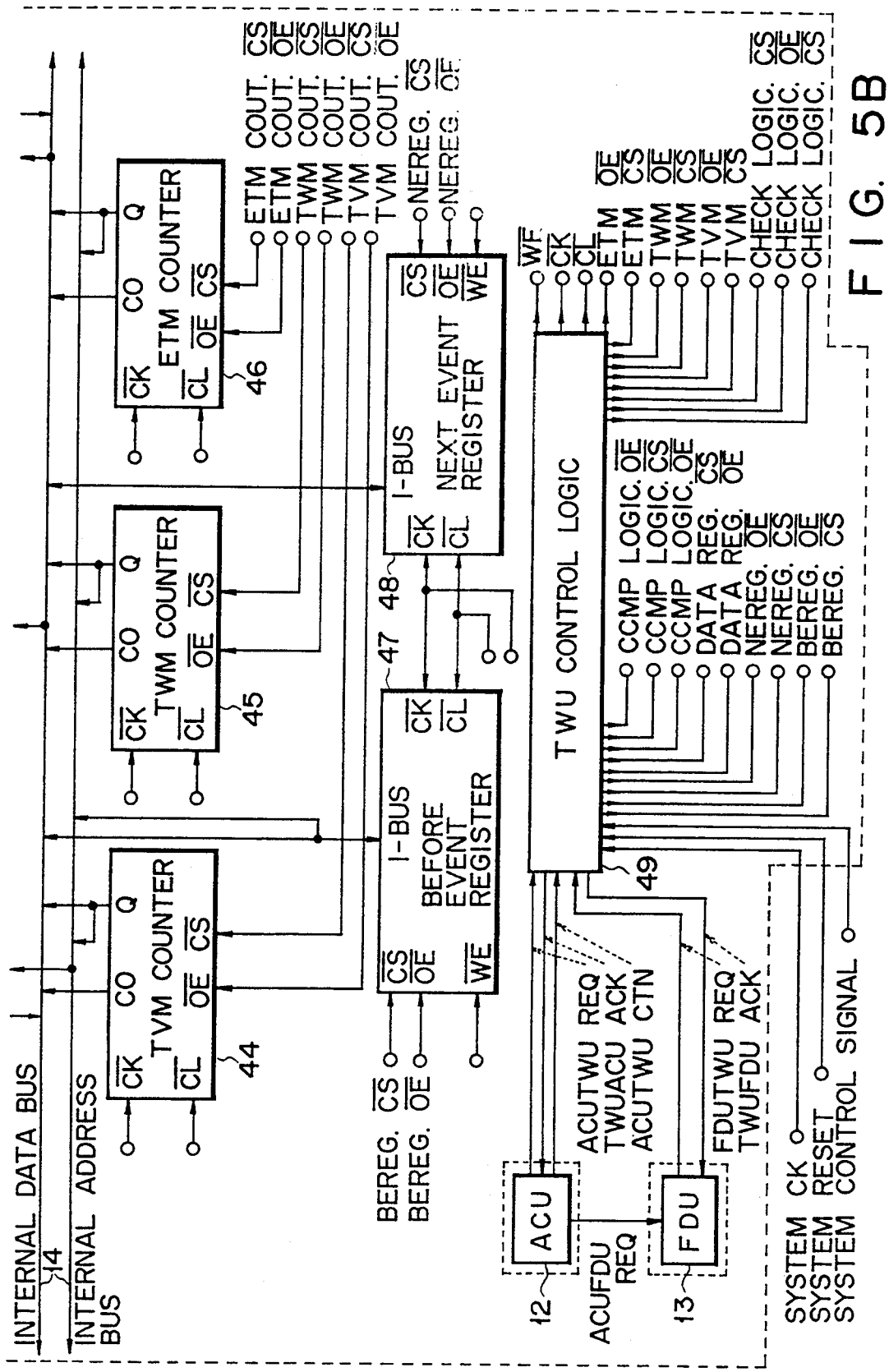

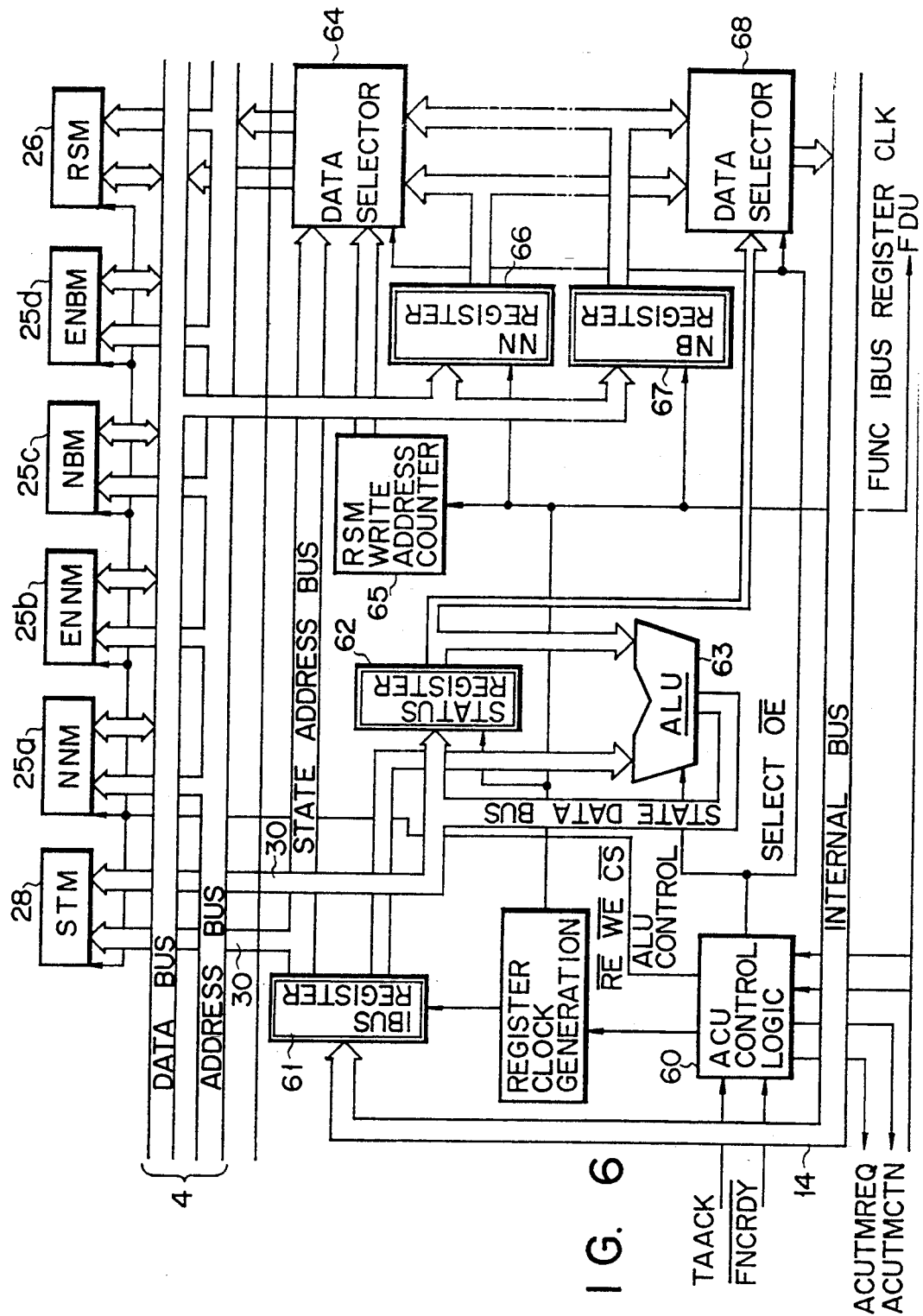
F I G. 6

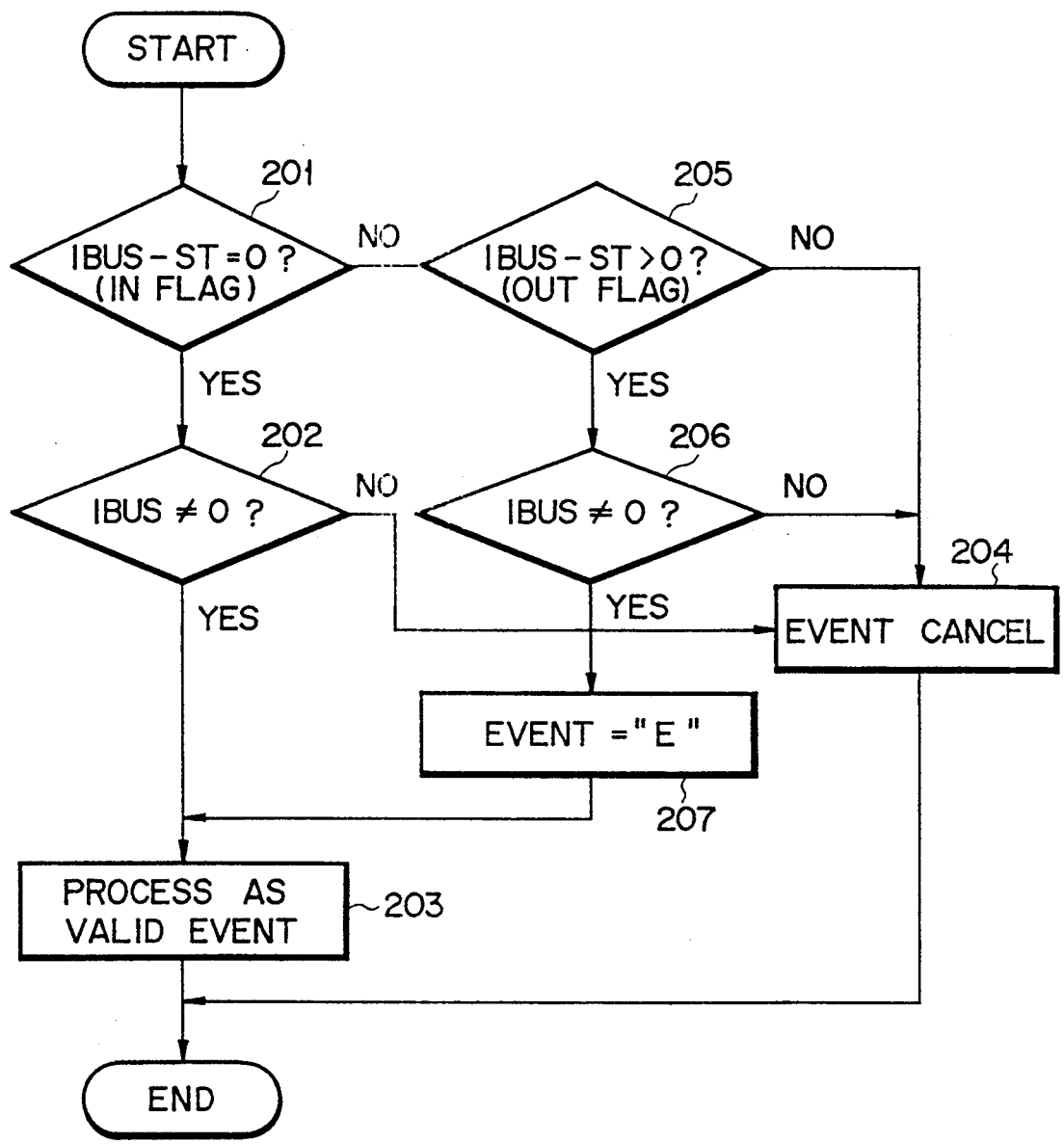
F I G. 7

APPARATUS FOR PERFORMING LOGIC SIMULATION

This application is a division of application Ser. No. 08/193,601, filed on Jan. 26, 1994, which is a File Wrapper Continuation application of Ser. No. 07/639,892, filed on Jan. 11, 1991, now abandoned.

BACKGROUND OF THE INVENTION

1. Field of the Invention

The present invention relates to an apparatus for performing logic simulation of a semiconductor device.

2. Description of the Related Art

A semiconductor device generally includes a logic circuit constructed by a large number of logic elements. For example, when a new semiconductor device is to be designed, logic elements are logic-simulated by a logic simulator to check whether a designed logic circuit operates as expected. Such a logic simulator is conventionally arranged by software by using a versatile computer or the like.

In order to increase an operation speed in logic simulation performed by a logic simulator, Published Unexamined Japanese Patent Application No. 59-3652 or 63-257841 proposes a logic simulator in which a portion of software of the logic simulator as described above is replaced by hardware.

Conventionally, when the level of the signal input to a gate (cell) constructing a logic circuit varies, that is, an event is generated, the event is output from the gate with a delay time according to rising or falling characteristic of the cell when another event is generated within the delay time from the input time to the output time, the output has an "X" state (undefined state). In addition, a phenomenon called "passing" in which an order of an output event and an order of an input event are reversed may occur. Also, the timing errors such as set-up time, wheel time and the like may occur in a memory cell such as flip-flop, counter and the like.

Thus, the conventional logic simulator is designed to select one of two modes. In one mode, a delay time is not calculated and simulation is executed without a timing error being detected. In the other mode, the 10 delay time is calculated, simulation is executed while simultaneously detecting the occurrence of a timing error, and a timing error, if it occurs, is displayed.

with the above conventional logic simulator, it is possible to know whether or not a timing error occurs, by looking at a display screen. However, since the occurrence of the timing error is not reflected in the results of simulation, what is simulated differs from an actual state.

SUMMARY OF THE INVENTION

It is an object of the present invention to provide a logic simulation apparatus enabling accurate simulation of a state which is as similar as possible to an actual state.

To achieve this object, the present invention provides a logic simulation apparatus which performs logic simulation of an operation of a logic circuit that includes a plurality of logic cells and a plurality of nets connecting the logic cells together. In the logic simulation apparatus, a check circuit detects a timing error which may occur with respect to the input timing of each logic cell, and upon detection of the timing error, the output of a logic cell related to the timing error is set in a value "X", and a logic simulation is executed.

According to the logic simulation apparatus of the present invention, the output of a cell with respect to which a timing error is detected is assigned with a value "X", and a logic simulation is effected under this condition. For instance, if an error occurs with respect to the data input set-up timing of a flip-flop, the value "X" is reflected not in the data produced at that time but in the output of the cell related to the timing error. Since, therefore, the timing error is reflected in the simulation results, the simulation of the present invention is more faithful to an actual state than that of the conventional method.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing a logic simulation apparatus using a logic simulator according to an embodiment of the present invention;

FIGS. 5A and 5B are a block diagram of a time wheel circuit of the logic simulators shown in FIG. 1;

FIG. 6 is a circuit diagram showing an accumulator section of the logic simulators shown in FIG. 1;

FIG. 7 is a flow chart for explaining procedures of timing error detection performed by the accumulator section.

DETAILED DESCRIPTION OF THE PREFERRED EMBODIMENTS

Figure 2A:
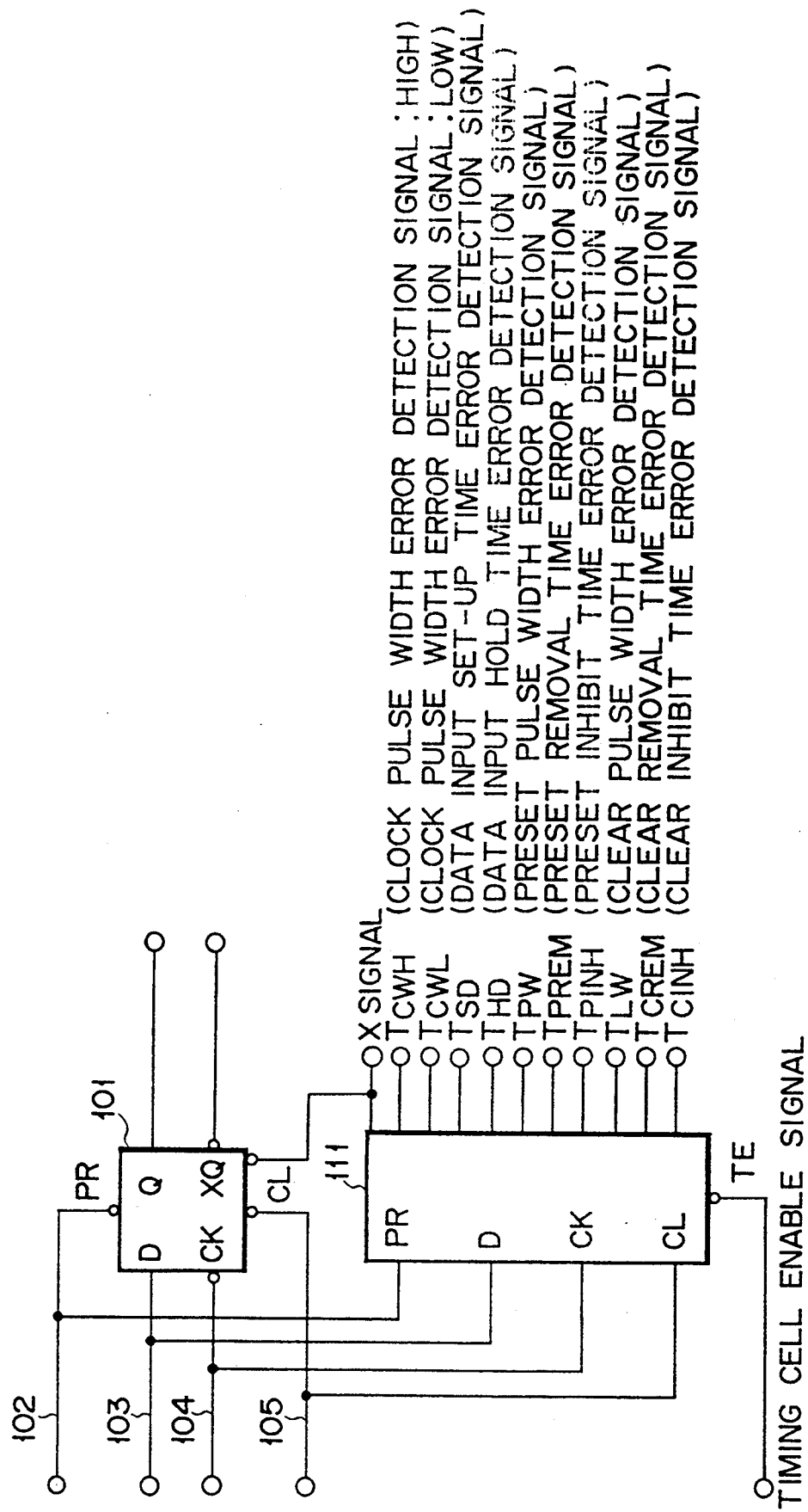
FIG. 2A is a block diagram for explaining processing for a memory cell in timing error detection.

According to a logic simulation apparatus using a logic simulator shown in FIG. 1, a simulation chip (logic simulator) 1 in which a logic simulation circuit is hardware-arranged on a chip, a data storage section 2 constituted by, e.g., a plurality of RAMs, and an engineering work station (to be referred to as an EWS hereinafter) 3 as an I/O device are connected to each other through an external bus 4.

The simulation chip 1 is constituted by a time wheel section (to be referred to as a TW section hereinafter) 11, an accumulator section (to be referred to as an ACC section hereinafter) 12, and a function logic circuit (to be referred to as an FLC section hereinafter) 13. The TW section 11 has a function of managing a time required to execute various simulation items to be performed for a logic element or logic circuit to be simulated, i.e., a to-be-logic-simulated element or circuit. Note that a time is assigned in correspondence with each simulation item so that the simulation items are sequentially repeatedly performed. The ACC section 12 has functions of monitoring a connection relationship of the nets of the to-be-logic-simulated element and checking a timing error. The FLC section 13 checks a logic operation of a logic gate in accordance with information supplied from the ACC section 12, e.g., data indicating the type of the logic gate and an event (signal level change) generated in an I/O net of the logic gate. In this case, since a delay time is present between generation of an event on an input side and generation of an event on an output side, data concerning the delay time is supplied to the TM section 11 to determine a timing at which the next logic simulation is to be executed. Since the operations of the TW section 11, the ACC section 12, and the FLC section 13 are cyclically repeated as described above, logic simulation of a to-be-logic-simulated element or circuit is performed.

In addition, this simulation chip 1 is arranged to select a mode (to be referred to as an A mode hereinafter) in which simulation is performed without detecting a timing error, a mode (to be referred to as a B mode hereinafter) in which simulation is performed while the presence/absence of a timing error is detected and a timing error is displayed if it is generated, and a mode (to be referred to as a C mode hereinafter) in which if a timing error is generated, an output from a cell in which the timing error is detected is set to be a value "X" to execute simulation so that simulation is performed in accordance with the timing error.

The data storage section 2 comprises a condition state memory (to be referred to as a CSM hereinafter) 21, a test vector memory (to be referred to as a TVM hereinafter) 22, a time wheel memory (to be referred to as a TWM hereinafter) 23, an event table memory (to be referred to as an ETM hereinafter) 24, a net information memory (to be referred to as an NIM hereinafter) 25, a result storing memory (to be referred to as an RSM hereinafter) 26, a delay table memory (to be referred to as a DTM hereinafter) 27, and a net signal state memory (to be referred to as an STM hereinafter) 28.

The TW section 11, the ACC section 12, and the FLC section 13 in the simulation chip 1 are connected to each other through an inner bus (an inner data bus and an inner address bus) 14. In addition, only the STM 28 of a plurality of memories is connected to the ACC section 12 through an exclusive state bus (a state data bus and a state address bus) 30.

Data required for simulation is input from the EWS 3 to the data storage section 2 and fetched in the simulation chip 1 as needed. Of the memories of the data storage section 2, the CSM 21 stores data required to respond to the EWS 3.

Data required for simulation are data concerning an arrangement of a logic circuit, i.e., net information data concerning a connection state of each cell (logic element) and data concerning a specification of each cell, and a test vector concerning an input signal for simulation. These data are written from the EWS 3 into the TVM 22, the NIM 25, and the DTM 27 before simulation is executed. Note that the test vector to be stored in the TVM 22 includes the type of change (to be referred to as an event hereinafter) such as the rising or falling of an input signal and information concerning the name of a net in which the event is generated in the order of generation. An event gate flag indicating the order of generation of an event is assigned to each.

As shown in FIG. 6, the net information data to be stored in the NIM 25 is divisionally stored in a net next stage memory (to be referred to as an NNM hereinafter) 25a and an extension net next stage memory (to be referred to as an ENNM hereinafter) 25b for indicating a cell connected to a net on the output side of a certain cell, and in a net before stage memory (to be referred to as an NBM hereinafter) 25c and an extension net before stage memory (to be referred to as an ENBM hereinafter) 25d for indicating a net connected to the input side of a certain cell. The net information data includes information concerning a cell type (e.g., an AND gate or an OR gate) and information concerning a fan out (load capacitance) of the cell. The DTM 27 stores a set value of a timing error such as a hold time or a set-up time of each cell and a delay time caused by the fan-out.

In the above data concerning the arrangement of a logic circuit, a memory cell such as a flip-flop or a counter is processed as follows in order to detect a timing error such as a set-up time or a hold time.

That is, as shown in FIG. 2A, a timing cell 111 for detecting a timing error is connected to nets 102 to 105 on the input side of a memory cell (flip-flop) 101.

Figure 2B:
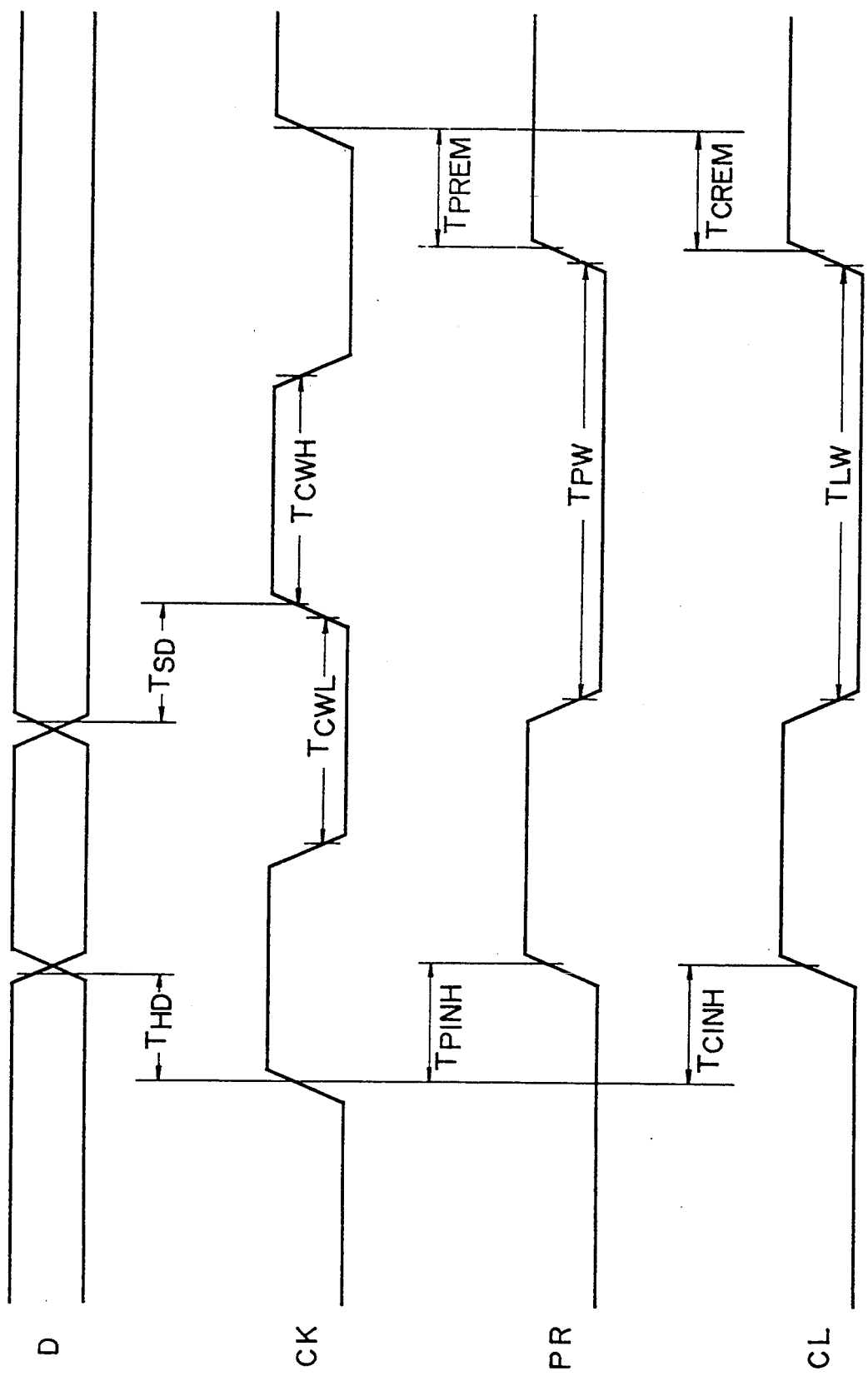
FIG. 2B is a timing chart for explaining the timing error detection.

More specifically, the timing cell 111 is connected to a cell (e.g., a flip-flop or a counter) in which the points in time of events of input signals (e.g., a data signal and a clock signal) are defined and is arranged as a virtual cell for checking if the defined time is maintained. For example, the timing cell 111 connected to the flip-flop 101 having set and reset terminals is assumed to generate ten outputs corresponding to ten types of errors, as shown in FIG. 2A. Net addresses corresponding to these ten outputs are assigned to the DTM 27, and timing error definition times determined by the cell are set at the net addresses of the DTM 27 as delay times. Operations up to this state are performed as preprocessing. For example, when a simulation is executed and the rising edge (event) of a clock signal CK occurs, as shown in FIG. 2B, timing errors which may be generated thereafter are a data hold time (THD) error, a clear inhibit time (TCINH) error, a preset inhibit time (PINH) error, and a clock pulse width (TCWL) error. Therefore, flags are set at net addresses corresponding to these errors, respectively. At this time, when pre-flag reset events for resetting these flags are stored when an event occurs at the data terminal D within the defined time, the hold time error flag is checked to detect a timing error.

The timing cell 111 is operated by a timing cell enable signal. When input timings from the nets 102 to 105 are before a predetermined timing, the timing cell 111 generates timing error detection signals such as clock pulse width error detection signals, a data input set-up time error detection signal, a data input hold time error detection signal, a preset pulse width error detection signal, a preset removal time error detection signal, a preset inhibit time error detection signal, a clear pulse width error detection signal, a clear removal time error detection signal, and a clear inhibit time error detection signal in accordance with each timing error item.

That is, when data concerning the memory cell 101 such as a flip-flop or a counter is input from the EWS 3, the memory cell data is input to the timing cell 111, as shown in FIG. 2A. In this case, if simulation is to be executed without performing timing error detection (A mode), the timing cell 111 is not operated. If simulation is to be executed while a timing error is displayed or is to be executed in accordance with a timing error (B and C modes), a timing cell enable signal is supplied to the timing cell 111 to operate the cell 111, thereby detecting a timing error.

In the C mode, the "X" signal which neither exhibits a high level nor a low level upon generation of a timing error is output from the timing cell 111 to the flip-flop 101. When the flip-flop 101 receives the "X" signal, a signal value "X" is set in each of the Q and XQ outputs of the flip-flop. That is, occurrence of the timing error can be reflected on the simulation of the flip-flop 101.

Figure 3:
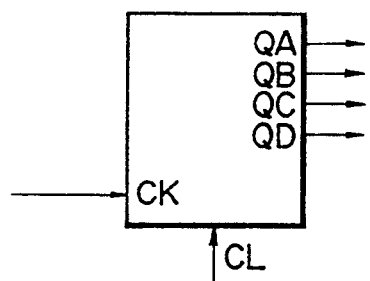
FIG. 3 is a view showing a multioutput memory cell.
Figure 4A:
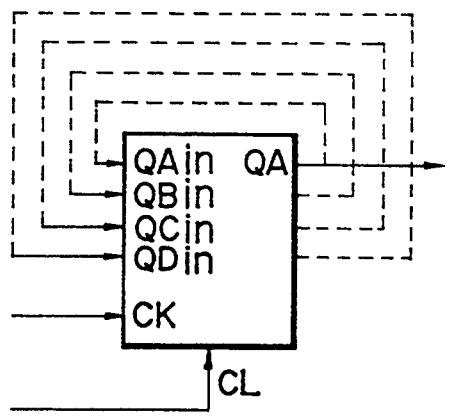
FIGS. 4A to 4D are views showing a plurality of memory cells obtained by dividing the memory cell shown 10 in FIG. 3 in units of outputs.
Figure 4B:
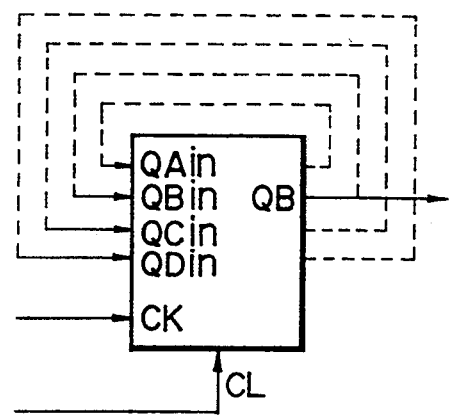
Figure 4C:
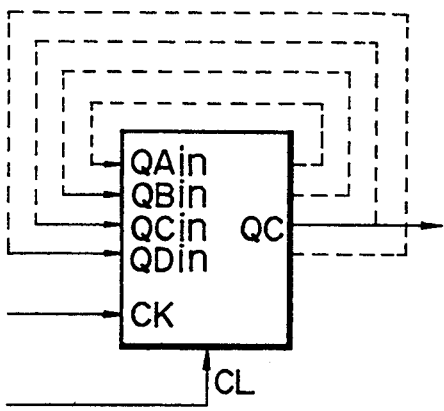
Figure 4D:
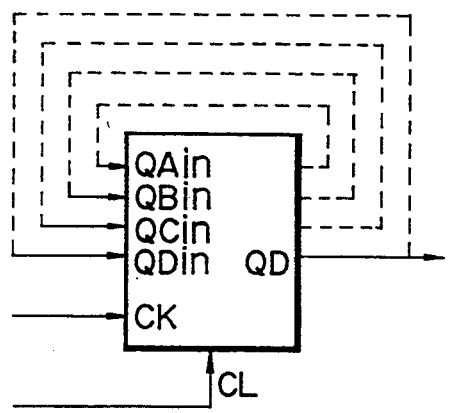

Note that the memory cell 101 and the timing cell 111 are illustrated as a multi-input/multi-output cell in FIG. 2A. In an actual operation, however, the memory cell 101 and the timing cell 111 are divided in units of outputs and processed as a plurality of multi-input/one-output cells, i.e., processed as a normal gate. More specifically, a multi-output memory cell having a plurality of outputs QA to QD as shown in FIG. 3 is processed as a plurality of one-output cells, in this embodiment, four one-output cells corresponding to the outputs QA, QB, QC, and QD as shown in FIGS. 4A, 4B, 4C and 4D. In addition, a net for performing feed-back from an output terminal as needed is provided for each of a plurality of one-output cells. Since the multi-output cell is divisionally processed as described above, when simulation is to be performed for a memory cell by the logic simulator 1, the simulation can be executed in consideration of an output from only one of the divided cells. Therefore, the multi-output memory cell can be processed as a normal cell such as an AND gate or an OR gate. That is, even if a memory cell internally has a complicated gate arrangement, calculation of a delay time or determination of an output logic value can be easily performed.

An arrangement and an operation of the simulation chip hardware-arranged on a single chip, i.e., the logic simulator 1 will be described below in an order of the TW section 11, the ACC section 12, and the FLC section 13.

Figure 5A:
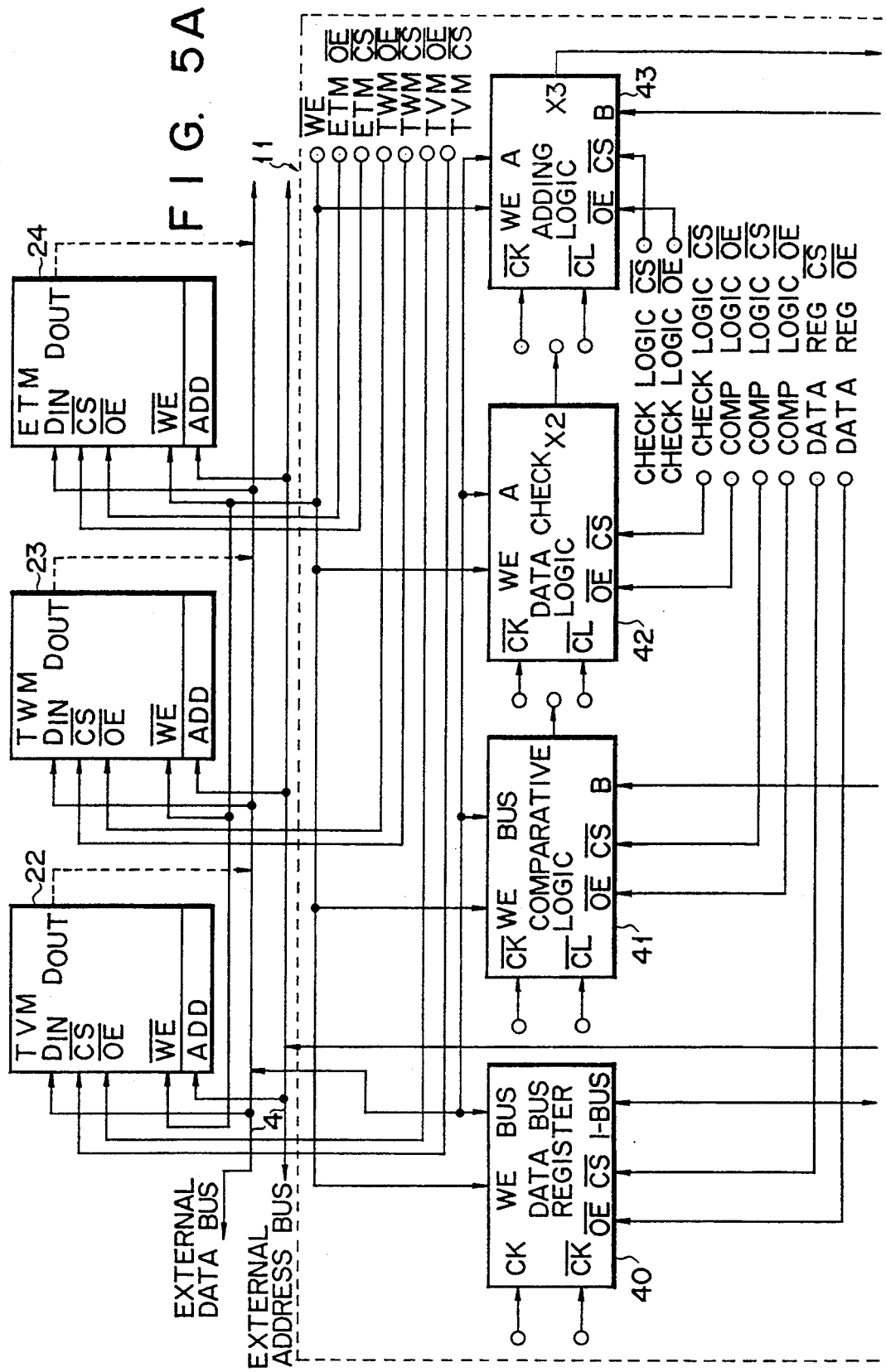

The TW section 11 is arranged as shown in, e.g., FIGS. 5A and 5B. In this TW section 11, test vectors written from the EWS 3 into the TVM 22 are sequentially read out and supplied to the TWM 23 and the ETM 24, and newly generated events are written between the test vectors in the order of generation timings.

That is, the TWM 23 stores an address value (pointer) in the ETM 24, which is a memory for managing events having an address as an absolute time and storing data concerning an event such as the name of a net in which an event is generated and an event value of the event, and a generation time (an address of the TWM 23: a pointer) of the next event. The ETM 24 has the name of a net in which an event is generated at a certain time and an event name of the event as data and further has an address value (pointer) of an ETM storing data of another event generated at the same time.

A data bus register 40 of the TW section 11 is a bidirectional register for connecting an inner bar and an outer bus. A comparative logic circuit 41 checks whether events are generated at the same time, and a data check logic circuit 42 checks whether a newly generated event or a loaded event disconnects a pointer (whether a chain of the pointer must be reconnected) or whether a memory write operation is inhibited. An adding logic circuit 43 calculates an absolute time of a newly generated event in accordance with a current absolute time and a delay value.

A TVM counter 44 is a counter for loading test vectors of the TVM 22 into the TWM 23, a TWM counter 45 indicates an absolute time as an address of the TWM 23, and an ETM counter 46 indicates an address of the ETM 24.

A before even register (to be referred to as a BE register hereinafter) 47 indicates current data of the TWM 23. A next event register (to be referred to as NE register hereinafter) 48 stores data loaded from the TVM 22 or newly generated event data.

A TW control logic circuit 49 controls an operation of the TW section 11.

The operation of the TW section 11 will be described.

The TWU section 11 loads a test vector for performing a simulation item stored in the TVM 22 to the TWM 23. (Note that loading is performed only within a time range indicated by the TWM 23.)

In the above operation, if events which are generated at the same time are present, the TW section 11 writes the names of nets in which the events are generated and event values of the events in the ETM 24, and an address of the ETM 24 is written in the TWM 23 as a pointer of the TWM 23. Note that this operation is performed by using the BE register 47 and the NE register 48. If a pointer indicating the next event generation time which is stored in the TWM 23 must be updated (a chain of the pointer must be reconnected) since a loaded event exceeds a previously loaded event, the pointer is updated.

When loading of the test vectors from the TVM 22 into the TWM 23 is finished as described above, the TWM 23 sequentially reads out events to the ACC section 12 in response to an event read request signal (ACC request) from the ACC section 12.

When data is supplied from the data storage section 2 to the ACC section 12, the right of use of the external bus 4 is transferred to the ACC section 12, and the TW section 11 waits until a newly generated event write request signal is supplied from the FLC section 13 or an ACC request is supplied from the ACU section 12.

When the ACU request is supplied, events are sequentially read out from the TWM 23 to the ACC section 12 again.

When the event write request signal is generated by the FDU section 13, the name of a net in which a new event is generated, an event value of the event, and a delay value are supplied to the internal data bus 14. The TW section 11 latches this data by the data bus register 40, calculates an absolute time of the newly generated event from a current absolute time and the delay value by the adding logic circuit 43, and writes the calculated absolute value into the TWM 23. In this case, if a pointer indicating the next event generation time of the TWM 23 must be updated (a chain of the pointer must be reconnected), the pointer is updated.

Thereafter, if an event is still present in the TWM 23, the event is read out from the TWM 23 to the ACC section 12, and the processing is similarly performed as described above. If no event is present in the TWM 23, test vectors in the next time range are loaded from the TVM 22 to the TWM 23, and the above processing is repeated. When all of the test vectors for performing simulation items stored in the TVM 22 are loaded and processed and all of the generated events are processed accordingly, the operation is ended.

In the embodiment shown in FIGS. 5A and 5B, an SRAM is used as each memory. If, however, a DRAM is used as the memory, a DRAM controller must be additionally used.

The ACC section 12 will be described below with reference to FIG. 6.

In the ACC section 12, an ACC control logic circuit 60 outputs an ACC request. When a TW acknowledge signal is supplied from the TW section 11, event data output from the internal bus 14 is latched by an IBUS register 61 in synchronism with the TW acknowledge signal. When the ACC section 12 receives the TW acknowledge signal, it obtains the right of use of the external bus 4. Therefore, the ACC section 12 latches the event data and an event read request signal at "L", thereby starting its internal operation. The STM 28 is accessed by the name (address) of a net in which the event latched by the IBUS register 61 is generated, and a current state (logic value) of the net in which the event is generated and an event gate flag are stored in a status register 62.

Thereafter, the event gate flag stored in the IBUS register 61 and indicating the event (current event) from the TW section 11 and the event gate flag supplied from the STM 28 and stored in the status register 62 are compared by an ALU circuit 63, thereby checking whether the current event is a valid event or an invalid event or must be replaced by a logic value "X" as an indeterminate event.

More specifically, when a certain input event is input to a cell, for example, an output event is output with a certain delay time in accordance with rising and falling characteristics and the like of the cell. If, however, another input event is present within the delay time from the input time to the output time, the output is set in an "X" state (undefined state). In addition, a phenomenon called "passing" in which an order of an output event and an order of an input event are reversed may occur in accordance with a relationship between rising and falling delay times of a cell, and such a timing error is detected as follows. Note that the event gate flag includes an event gate in flag and an event gate out flag. When an event is present at the input of a cell and a feature event is generated at the output thereof, the event gate in flag indicates an input order incremented when the feature event is written in the TWM 23. The event gate out flag indicates a feature event extracted from the TWM 23.

As shown in FIG. 7, an arithmetic operation of (contents of IBUS register 61)—(contents of status register 62) is performed for the event gate flag, and 10 whether the obtained value is zero is checked (step 201). If the value is zero, events propagating inside the cell are only a current event or a current event is generated by the latest input of the events propagating inside the cell. If the value is zero, therefore, IBUS≠0 (step 202) is checked for an event signal. If the current event changes an old signal value of the net, this event is processed as a valid event (step 203). If the current event does not change the old signal value of the net, this event is canceled and determined to be not present (step 204).

If the value obtained by the arithmetic operation step 201 is not zero, another event propagating inside the cell is present. That is, for example, after the current event is written in the TWM 23 as a feature event, another event may have been generated at the input of the cell before the current event is read out after a delay time. If the arithmetic value is not zero in step 201, therefore, an arithmetic operation of (contents of IBUS register 61)—(contents of status register 62) is performed for the event out flag, and whether the obtained value is larger than zero (one or more) is checked (step 205).

If the above value is zero or less, it is determined that the current event is passed by another event propagating through the cell, and the current event is unconditionally canceled (step 204). If the value is larger than zero (one or more), the current event is not passed by another event during propagation inside the cell and has a logic value "X". If the value is one or more, therefore, IBUS≠0 is checked for the event signal (step 206).

If the current event changes an old signal value of the net, the logic value is set to be "X" (step 207), and the current event is processed as a valid event (203). If the current event does not change an old signal value of the net, this event is canceled and determined to be not present (step 204).

If the current event is determined to be invalid by the determination results as described above, the event gate flag of the IBUS register 61 is written in the STM 28 to prepare for calculation of the next event data from the TW section 11, thereby finishing the processing of the current event.

If the current event is determined to be valid in the above determination, the processing is continuously performed as follows.

That is, the current event of the IBUS register 61 and the event flag data are written in the STM 28, and the contents of the current event are stored in the RSM 26 via a data selector 64.

At this time, an address in which the current event is to be written is sequentially incremented from, for example, "0000" to "FFFF" by an RSM write address counter 65.

Note that the result of simulation is temporarily written in the TWM 23 or ETM 24 and read out from the memory after a delay time. The simulation result is not written in the RSM 26 as a past event until the event flag data is checked. The ACC section 12 starts an operation of obtaining an output change (next stage event) of a next stage cell generated by the current event.

First, the NNM 25a in the NIM 25 is accessed by the name (address) of a net which is latched by the IBUS register 61 and in which an event is generated, and the name (address) of a net in which the next stage event may be generated, the type of cell, and fan out are stored in an NN register 66. If two or more nets in which a next stage event may be generated are present, only pointers for connecting next stage net addresses are read out for the second and subsequent nets. After the first next stage net is processed, the second and subsequent next stage nets are sequentially read out and processed in accordance with the pointers.

The NBM 25c in the NIM 25 is accessed by the address of the next stage net stored in the NN register 66, and an address of an input net having an influence on the next stage net and its input pin code (e.g., clock, clear, data enable, or load) are stored in an NB register 67. If two or more addresses are present in the input net, the next stage nets are read out in units of inputs by using pointers similar to the next stage nets. In addition, the STM 28 is accessed in accordance with the address of the next stage net stored in the NN register 66 by parallel processing, and a current state (logic value) of the next stage net and the event gate flag are stored in the status register 62.

Thereafter, the STM 28 is accessed in accordance with the address of the input net stored in the NB register 67, and a current state (logic value) of the input net is stored in the status register 62. The ENBM 25d is accessed in accordance with the pointer for connecting the address of the input net stored in the NB register 67, and an address of another input net is stored in the NB register 67. Information concerning the next stage net, the input net, the pin code, the cell type, the fan out, and the like stored in the status register 62, the NN register 66, and the NB register 67 is transferred from a data selector 68 to an input register of the FLC section 13 via the internal bus 14 each time the status register 62 is rewritten.

when all the information are transferred to the FLC section 13, the ACC control logic 60 outputs an ACU continue or ACC request to give the right of use of the external bus 4 to the FLC section 13.

That is, if a plurality of next stage nets are present, the ACC section 12 outputs an ACC continue signal and waits until the processing in the FLC section 13 and the TW section 11 is finished. If TW acknowledge is present, the above processing is repeated for the next stage net. If no next stage net is present, the internal NN register 66, NB register 67, and status register 62 are all cleared, and the next current event is output from the TW section 11 onto the internal bus 14. The ACC control logic 60 outputs an ACU request, and the ACC section 12 waits until TW acknowledge is output.

Figure 8:
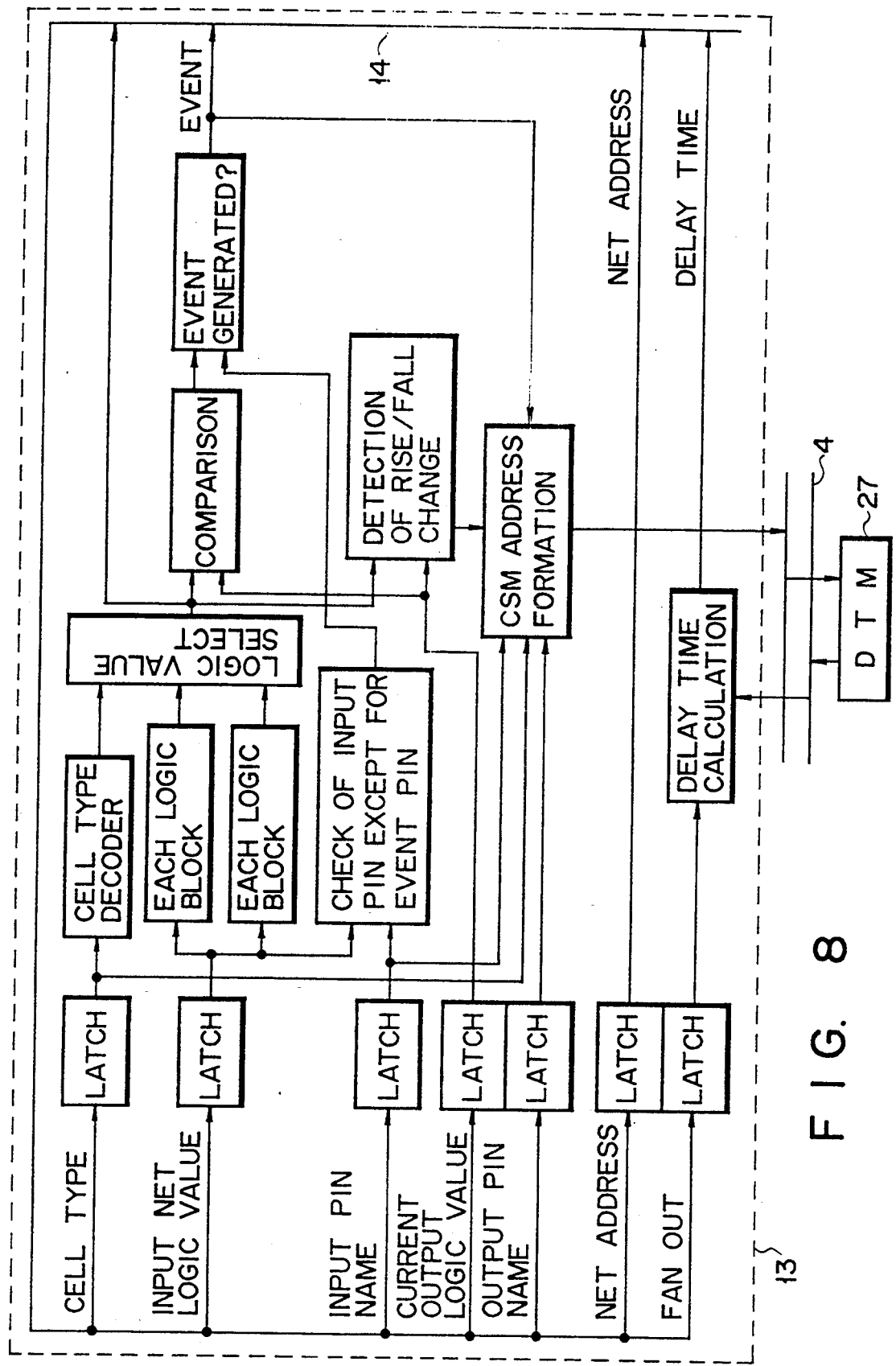
FIG. 8 is a block diagram showing a function logic section of the logic simulator shown in FIG. 1.

The FLC section 13 will be described below with reference to FIG. 8.

First, the FLC section 13 latches the data transferred from the ACC section 12 as described above. In each logic block, an output logic value is determined in accordance with an input logic value, and an output logic value of a designated cell is selected from cell type data.

The FLC section 13 compares the selected output logic value with a current output logic value and checks generation of an event (presence/absence of a signal level change). If an output is determined by input data other than an event pin (in which an event is generated), the FLC section 13 determines that no event is generated. If no event is generated, the FLC section 13 supplies a signal indicating that no event is generated to the internal bus 14, and the processing of the FLC section 13 is finished. If an event is generated, the FLC section 13 checks a rising/falling change of the event in accordance with the current output logic value and the selected output logic value and forms an address of the DTM 27 in accordance with a cell type, an input pin name, and an output pin name. In addition, the FLC section 13 supplies a delay time or a set value of a timing error which is input from the DTM 27, the net address, the presence/absence of an event, and the logic value to the internal bus 14, thereby finishing the processing of the FLC section 13.

As has been described above, according to the present invention, since the above processing of the TW section 11, the FLC section 12, and the FDU section 13 is repeatedly performed, the logic simulator 1 can execute high-speed simulation for a change over time of a to-be-simulated logic element in accordance with test vectors in the TVM 22 without exchanging data with respect to the EWS 3 during simulation.

When the A mode is selected as the simulation mode, no timing error detection as described above is performed. That is, the logic simulator of this embodiment can select the A mode in which simulation is performed without detecting a timing error, the B mode in which simulation is executed while the presence/absence of a timing error is detected and if a timing error is detected, the detected timing error is displayed, and the C mode in which if a timing error is generated, simulation is executed while an output from a cell in which the timing error is detected is set to be a value "X" so that the simulation is performed in consideration of the timing error. By selecting the C mode, therefore, simulation can be performed in a state closer to a real state as compared with conventional simulation. In addition, since all the logic portions except for the memories are formed as hardware on a single chip and this hardware can solely perform simulation, simulation can be performed at a high speed and within a short time as compared with conventional simulation.

Note that in the above embodiment, the hardware logic simulator having the TW section 11, the ACC section 12, and the FLC section 13 on a single chip has been described. The present invention, however, can be similarly applied to hardware logic simulators divided on a plurality of (e.g., two or three) chips and a conventional software logic simulation system using a software technique.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A logic simulation apparatus which performs logic simulation of an operation of a logic circuit which includes at least a plurality of logic cells and a plurality of nets connecting the logic cells together, said apparatus comprising:

a check circuit having at least one data input to which a data input signal is applied, a clock input to which a clock signal is applied, and an output, said check circuit comparing said data input signal with a predetermined data value at a time determined by said clock input signal and producing at said output of said check circuit a timing error detection signal based on the comparing; and a memory cell having said data input signal applied to one input thereof, and the output signal of said check circuit applied from the output of said check circuit to another input of said memory cell, said memory cell having an output outputting said data input signal when said timing error detection circuit indicates that no timing error has occurred and outputting a signal which exhibits neither a high level nor a low level when the timing error detection signal indicates a timing error has occurred; and means for executing the logic simulation on the basis of the output signal output by said memory cell so that said output signal is immediately propagated in said logic simulation.

* * * * *